United States Patent
Jajoo et al.

(10) Patent No.: US 7,921,224 B2
(45) Date of Patent: Apr. 5, 2011

(54) METHOD OF MAINTAINING TRAFFIC SERVICES THROUGH CONGESTION CAUSED BY NETWORK FAILOVERS

(75) Inventors: Sandesh R. Jajoo, Randolph, NJ (US); Chandrashekar Sodankoor, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1005 days.

(21) Appl. No.: 11/647,931

(22) Filed: Dec. 29, 2006

(65) Prior Publication Data

US 2008/0162981 A1 Jul. 3, 2008

(51) Int. Cl.
*G06F 15/16* (2006.01)
(52) U.S. Cl. ........ 709/235; 709/224; 709/232; 709/233; 709/234
(58) Field of Classification Search .............. 709/224, 709/232, 235, 233, 234
See application file for complete search history.

(56) References Cited

U.S. PATENT DOCUMENTS

| 2006/0198508 | A1* | 9/2006 | Delaney et al. | 379/221.12 |
| 2006/0203719 | A1* | 9/2006 | Kim et al. | 370/227 |
| 2006/0277298 | A1* | 12/2006 | Kim et al. | 709/224 |

* cited by examiner

*Primary Examiner* — Djenane M Bayard
(74) *Attorney, Agent, or Firm* — McCormick, Paulding & Huber LLP

(57) ABSTRACT

In a method for controlling data traffic in a wireless or other communication network, one or more hardware/software agents are deployed to interface with one or more network entities such as routers, switches, backhaul transmission lines, and wireless base stations. The agents monitor the L1 (physical) and L2 (data link) layers of the network for the presence of indicators associated with network failover operations, such as DS1 alarms and protocol errors, respectively. Based on detected indicators across all monitored network entities, the agents determine if a failover operation has occurred. If so, data congestion associated with the failover operation is controlled according to a failover congestion monitoring and recovery mode (e.g., a data source backoff model), to reduce instances of dropped calls that would otherwise occur if the failover congestion were handled according to a general purpose congestion monitoring and recovery mode of the network.

18 Claims, 3 Drawing Sheets

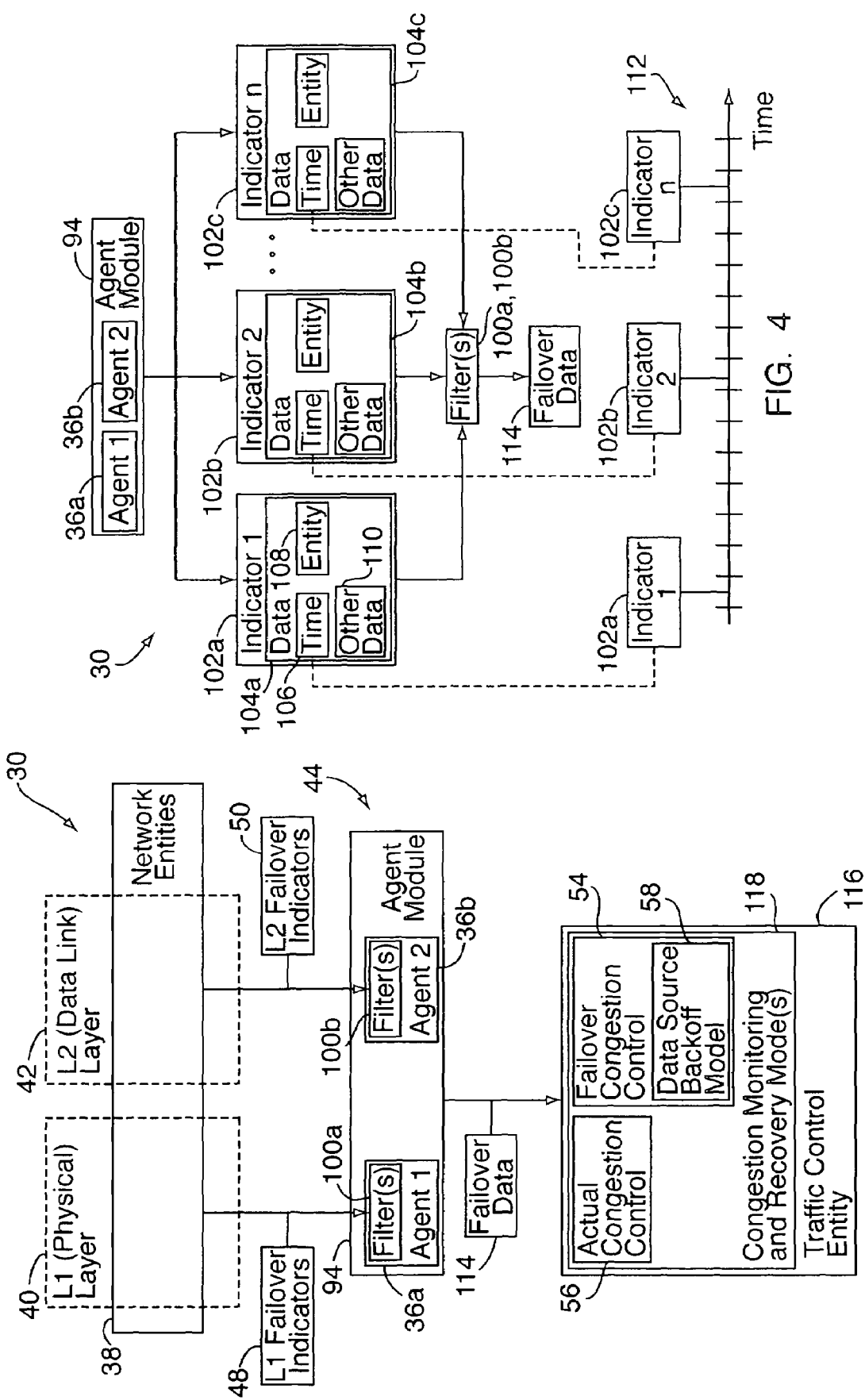

METHOD OF MAINTAINING TRAFFIC SERVICES THROUGH CONGESTION CAUSED BY NETWORK FAILOVERS

FIELD OF THE INVENTION

The present invention relates to communication systems and, more particularly, to traffic control in a wireless telecommunication network or other network.

BACKGROUND OF THE INVENTION

In a communication network, "failover" is the capability to switch over automatically to a redundant or standby network component or communication link or pathway (e.g., computer server, router, controller, optical or other transmission line, or the like) upon the failure or abnormal termination of the previously active component or link. In operation, one or more designated network components are electronically monitored on an ongoing basis. Upon failure of one of the designated components, the system automatically carries out a failover operation for switching to a redundant or standby system, without the need for human intervention. Failover capability is usually provided in servers, systems, or networks where continuous availability and a high degree of reliability are required, such as in wireless communication networks.

Although failover operations preserve overall network integrity by maintaining communications across the network, in certain systems they may result in network congestion, a decrease in data throughput, dropped calls, and the like. Failure in a multilink group (a multilink group is a set or grouping of data links or nodes) typically causes congestion in forwarding data packets over that hop, including the delay of time sensitive air interface data. Such congestion can last much longer than the network can support. In an IP (Internet protocol)-based wireless network, e.g., a "1x-EVDO" (Evolution Data Optimized, or Evolution Data Only) network, path redundancy is normally built using IP routes and standby/backup devices. Upon failover to such redundant components, the IP routes are typically divided into two fractions. Each fraction notices congestion.

An example of the effect of failover on network congestion and performance is shown in FIG. 1 for an IP-based wireless network utilizing automatic protection switching (APS). APS is a failover protection mechanism for optical networks, e.g., the optical backhaul portion of a wireless network connecting one or more base stations to a radio network controller or the like. The network operates in a congestion monitoring and recovery mode, in a standard, ongoing manner, to maintain a designated minimum quality level for a maximum number of calls. (The quality level may be assessed in terms of a target frame error rate, or in terms of other designated parameters.) In this mode, traffic conditions are monitored, and communications are controlled (e.g., call admissions and drops, soft handoff, and the like) based on the traffic load and/or instantaneous available bandwidth. Thus, network load may be dropped if required to maintain acceptable levels of voice quality, according to a designated transmission hierarchy. For example, it may be the case that data-only transmissions and the handoff legs of voice calls are dropped before other, higher-priority transmissions.

The available bandwidth 10 for a multilink group in the network is shown in FIG. 1 as a function of time, as is the aggregate traffic 12 and the signaling traffic volume 14, which is normally carried over TCP (transmission control protocol) or a similar protocol. At time T1, an APS failure occurs, such as the failure of an optical backhaul circuit or the like. Subsequent to time T1, the instantaneously available bandwidth 10 decreases as the system automatically commences switching from the failed optical circuit to a redundant circuit. Due to the time lag in detecting and switching from the failed component to the redundant component, there is a temporary decrease or interruption in the network resources for the multilink group, resulting in a concomitant reduction in effective bandwidth. At time T2, the available bandwidth 10 falls below the traffic volume 12, resulting in dropped traffic 16 as the network compensates for the reduced bandwidth according its congestion monitoring and recovery functionality. Although the available bandwidth is reduced, it is typically the case that a certain minimum amount of bandwidth 18 is retained, e.g., the bandwidth associated with a single T1/DS1 line or circuit. (A DS1/T1 circuit is made up of twenty-four 8-bit channels or timeslots, each channel being a 64 kbit/s multiplexed pseudo-circuit.) At time T3, for a stateless failover, the multilink group is renegotiated for adding a DS1 circuit through the redundant system component(s), resulting in a stable bandwidth being achieved at T4 and dropped transmissions being setup automatically where possible. Generally speaking, a "stateless" failover is one where (i) the standby component assumes the communication addresses of the failed entity, e.g., IP and MAC addresses, but (ii) any open connections are closed, requiring renegotiation and reconnection with the standby component. In stateful failovers, on the other hand, the primary and standby components exchange state information over a private link so that applications with open connections during a failover do not have to reconnect to the communication session.

Because failover operations result in decreased bandwidth and a perceived congestion condition, and because the network normally handles congestion by dropping the load at the source, failover operations may result in dropped calls. This is the case even though the congestion is temporary and not a result of actual aggregate traffic load in the network. In particular, the recovery process starts at time T2, when congestion begins. In some systems, the congestion recovery process requires a handshake over the route, such as in wireless networks where internal resources are released on both ends of the network. Such handshakes may not arrive in time because of the congestion, meaning that recovery may extend beyond the time of failover, e.g., past time T4. Delayed recoveries can lead to unnecessary traffic and/or call drops, which impact service conditions for both the end user and service provider.

SUMMARY OF THE INVENTION

The present invention relates to a method of data traffic control in a wireless communication network or other network, e.g., to maintain traffic services through congestion caused by network failovers. In one embodiment, one or more network entities are monitored to determine if a failover operation has occurred in the network. Network "entity" refers to physical components of the network, either alone or grouped together, such as routers, switches, controllers, base stations, and transmission lines, as well as to logical elements in the L1 (physical) or L2 (data link) layers of the network, such as multilink groups. If a failover operation has occurred, actual data congestion (meaning congestion due to the volume of data traffic in the network) and data congestion associated with the failover operation are controlled in differentiated manners. For example, the failover data congestion may be controlled according to a failover congestion monitoring and recovery mode. In this mode, the source and nature of the failover congestion are taken into consideration to reduce instances of dropped calls that would otherwise occur if the failover congestion were handled according to a general purpose congestion monitoring and recovery mode of the network.

Thus, in cases where a standard control mode would automatically drop calls to alleviate failover congestion, the system of the present invention recognizes that such dropped calls are in most case unnecessary. Data traffic is controlled to account for failover congestion in a manner that reduces or eliminates the need for call drops, with network traffic being maintained to the maximum extent possible. (Although network transmissions are sometimes characterized in the industry as either voice or data transmissions, "data" and "data traffic" refer herein to any packet-based or other network traffic in a general sense, and not just to non-voice data.)

In another embodiment, the L1 and L2 network layers are monitored for indications associated with failover operations in the network. For example, the L1 layer may be monitored for occurrences of physical layer alarms (e.g., DS1 alarms) generated by one or more network entities, and the L2 layer may be monitored for occurrences of data link protocol errors and/or information and signaling exchanges associated with failover operations in the data link layer. The L1 layer is monitored using a software/hardware agent configured for detecting the L1 failover indicators of interest. Similarly, the L2 layer is monitored using another software/hardware agent configured for detecting L2 failover indicators. The agents may be implemented in hardware and/or software, and are interfaced with the network entities as such.

In another embodiment, the failover indicators generated by the monitored network entities are correlated or cross-referenced to a time scale of data transfer over the network. In other words, each indicator, besides being associated with a particular network entity (or group of entities) and/or other data relating to the nature of the indicator, is associated with a time of when the indicator occurred, relative to the other indicators. One or more filters process the indicator data for determining if a failover operation has occurred, e.g., the filters are part of the software/hardware agents, and/or work in conjunction therewith. (By "determine," it is meant not an absolute determination, but rather a determination within a range of acceptable error, e.g., a prediction or approximation.) By taking into account both L1 and L2 indicators across a time period of interest, it is possible to more accurately determine whether a failover operation has occurred, as opposed to relying on L1 indicators alone (e.g., DS1 alarms), which may be filtered out by certain network entities.

In another embodiment, one or more network entities carry out traffic control procedures on an ongoing basis. Such network entities may include, for example, wireless network base stations and radio network controllers. Data traffic is controlled according to a congestion monitoring and recovery algorithm/process. For actual data congestion, that is, data congestion associated with data traffic volume in the network and/or not specifically associated with a failover operation, data packets associated with the actual data congestion are controlled in a standard manner according to the network's designated communication protocols. For example, data sources may be controlled to reduce the traffic load if required for maintaining a designated minimum quality level for high priority communications, including possible dropped calls. In regards to data congestion resulting from or relating to failover operations, the filters provide the traffic control entity with information indicating that a failover has occurred and/or that associates certain traffic congestion with a failover operation. Using this information, data packets associated with the failover data congestion are controlled in a manner that accounts for the temporary nature of the failover data congestion, considering that in many cases of failover congestion it is not actually necessary to drop calls to compensate for the congestion. In one embodiment, for example, data packets associated with the failover congestion are controlled according to a data source backoff model, which controls delays in transmission and/or re-transmission of the data packets at the transmission source(s). In other words, instead of dropped calls, data packets are delayed in a controlled manner until the failover operation is finished.

BRIEF DESCRIPTION OF THE DRAWINGS

The present invention will be better understood from reading the following description of non-limiting embodiments, with reference to the attached drawings, wherein below:

FIGS. 3-5 are schematic diagrams showing a system and method of maintaining traffic services through congestion caused by network failovers, according to various embodiments of the present invention.

DETAILED DESCRIPTION

Figure 1:
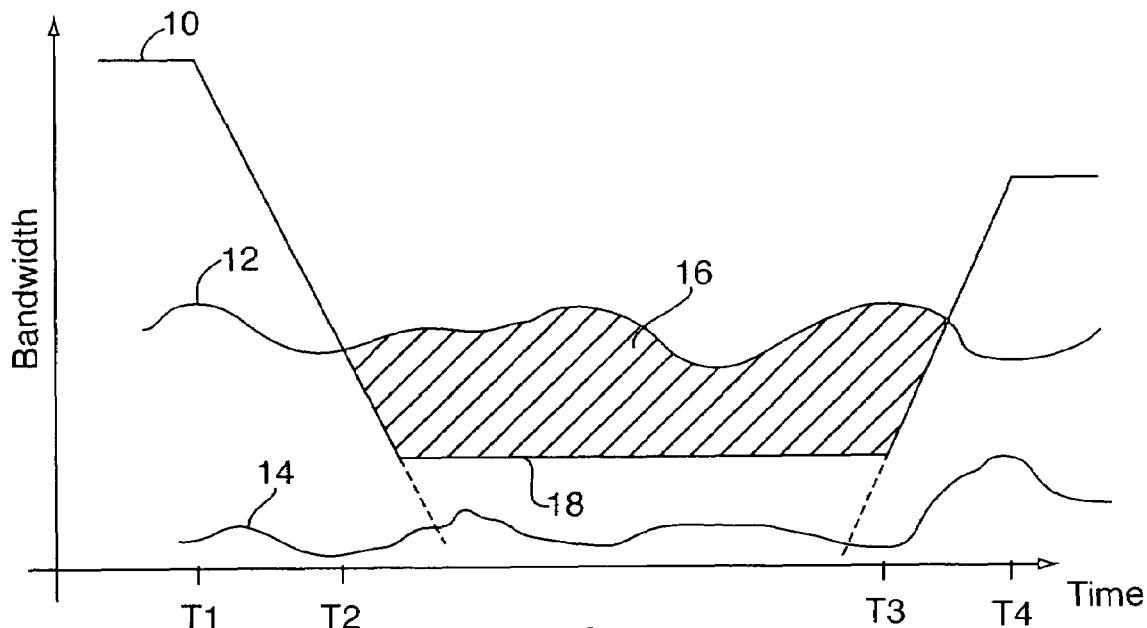
FIG. 1 is a diagram showing the effect of a failover operation on optical backhaul bandwidth in a communication network.
Figure 5:
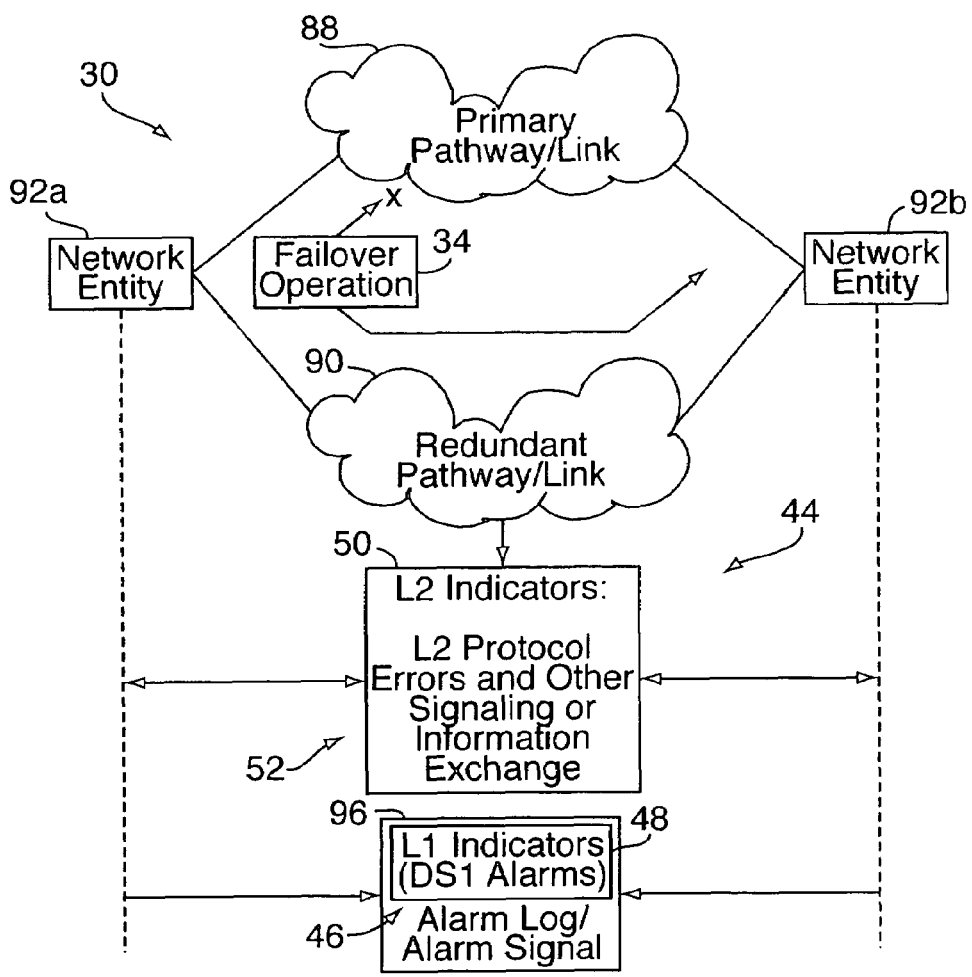

With reference to FIGS. 2-5, the present invention relates to a system and method 30 for controlling data traffic in a communication network 32, to maintain traffic services through congestion caused by network failovers 34. First and second hardware/software agents 36a, 36b are deployed to interface with one or more network entities 38. The first agent 36a monitors the L1 (physical) layer 40 of the network 32, and the second agent 36b monitors the L2 (data link) layer 42 of the network 32. The L1 and L2 layers 40, 42 are monitored for the presence of indicators 44 associated with failover operations 34 in the network 32. For example, one agent 36a may monitor the L1 layer 40 for DS1 alarms 46 or other L1 failover indicators 48. The second agent 36b may monitor the L2 layer 42 for L2 failover indicators 50 including protocol errors and/or information and signaling exchanges 52 associated with failover operations. (Generally speaking, the indicators 48, 50 are operational indicators of the layers' administrative states.) Based on the ongoing monitoring, the agents 36a, 36b determine if a failover operation 34 has occurred. If so, data congestion associated with the failover operation is controlled according to a failover congestion monitoring and recovery mode 54, to reduce instances of dropped calls that would otherwise occur if the data congestion were handled according to a general purpose congestion monitoring and recovery mode 56 of the network. For example, the failover mode 54 may use a data source backoff model 58 that controllably delays data packet transmissions and re-transmissions at the source(s), thereby delaying data instead of shredding the load entirely.

In a more general sense, the system 30 differentiates between failover congestion and actual congestion. How the traffic is controlled in either case can be both implementation-dependent and traffic-type dependent. Thus, different traffic types can be subjected to a reduction/shredding process, and/or to a delay process, and/or to a dropping process.

Figure 2:
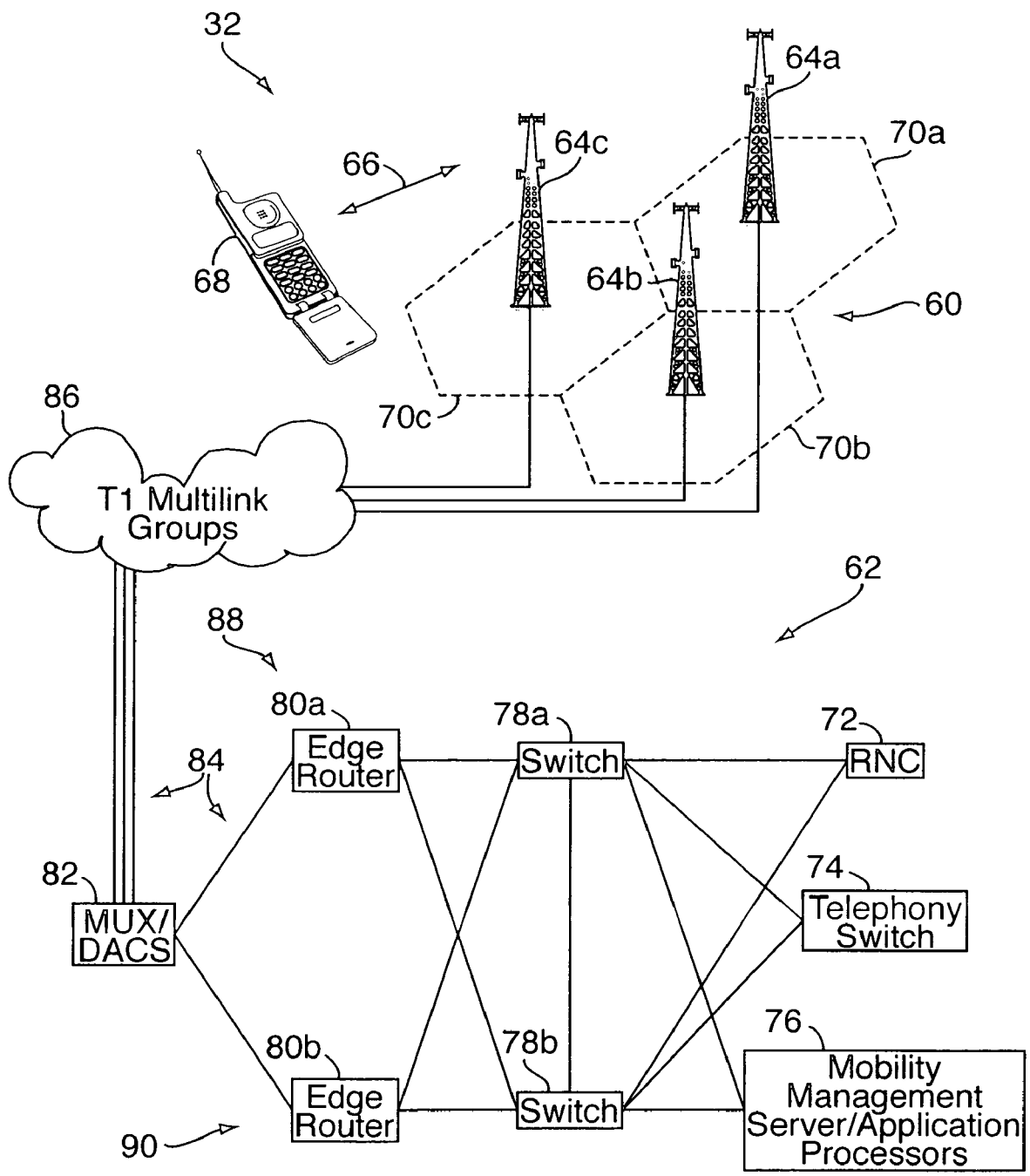
FIG. 2 is a schematic diagram showing a wireless communication network.

Turning to FIG. 2, the network 32 may be a CDMA-based 1x-EVDO network or other wireless network having a radio access network portion ("RAN") 60 and a core or backhaul IP network portion 62. The RAN 60 includes one or more fixed base stations 64a-64c, each with various transceivers and antennae for radio communications 66 with a number of distributed wireless units 68, e.g., mobile phones, "3-G" (third generation) wireless devices, wireless computer routers, and the like. The RAN 60 is geographically divided into a plurality of cells 70a-70c, each served by one or more of the base stations 64a-64c. The base stations 64a-64c are in turn connected to the network core 62, which includes a number of network entities that enable data to be transferred over the network. As noted above, network "entity" refers to the physical components of the network, either alone or grouped together, such as routers, switches, controllers, base stations, and transmission lines, as well as to logical elements in the L1 (physical) or L2 (data link) layers of the network, such as multilink groups. Thus, for controlling the transfer of data packets to and from the base stations 64a-64c for transmission to the wireless units 68, the network core 62 may include a radio network controller ("RNC") 72, a telephony switch 74 (e.g., a Lucent® 5ESS switch that provides voice and data switching for local calls, long-distance calls, Internet access, and the like), and a mobility management server or other application processors 76. (Typically, one or more of the aforementioned entities are further connected to various internal and external networks (not shown), such as a public switched telephone network (PSTN) and the Internet.) Other possible components include: network switches 78a, 78b for connecting multiple network segments; edge routers 80a, 80b, which are devices that route data packets between one or more local area networks and an ATM backbone network; a multiplexer and/or DACS 82 (digital access cross connect switch); and optical and other transmission lines 84 such as T1 lines and OC3 lines, at least a portion of which are configured and interconnected to form a SONET fiber optic network for high speed data transfer. The transmission lines 84 may be logically bundled into multilink groups 86, as is also the case with the other network entities. In particular, a multilink group represents a group of data links/nodes, which may be defined in many ways depending on the network's communication protocols (e.g., standard defined negotiation protocols, errors, and configuration negotiation) and the particular components in place in the network. Each multilink group will have two endpoints, with each end point being configurable independently.

According to the OSI network model, communication networks 32 are typically characterized as having seven functional layers. The layers define and/or describe the different, interrelated aspects of the network as regarding data transfer and user interaction with the network. The first layer is the L1 or physical layer, which defines the cable or other physical medium for conveying the bit stream—electrical impulse, light, or radio signal—through the network at the electrical and mechanical level. The second layer is the L2 or data link layer, wherein data packets are encoded and decoded into bits according to a defined format, e.g., a network data frame or packet may include a checksum, source and destination address, and data. The L2 layer furnishes transmission protocol knowledge and management and handles physical layer errors, flow control, and frame synchronization. The data link layer is divided into two sub-layers: the Media Access Control (MAC) layer and the Logical Link Control (LLC) layer. The MAC sub-layer controls how an entity on the network gains access to the data and permission to transmit it. The LLC sub-layer controls frame synchronization, flow control, and error checking. The remaining layers include: the third, network layer, which provides the functional and procedural means of transferring variable length data sequences from a source to a destination via one or more networks while maintaining the quality of service requested by the transport layer; the fourth, transport layer, which provides for the transparent transfer of data between end users, including flow control, segmentation/de-segmentation, and error control; the fifth, session layer, which controls the dialogues (sessions) between computers or other entities, including establishing, managing, and terminating connections between the local and remote applications; the sixth, presentation layer, which transforms data to provide a standard interface for the application layer, including MIME encoding, data compression, and data encryption; and the seventh, application layer, which provides a means for the user to access information on the network through an application.

As should be appreciated, network layers are functional definitions or characterizations of network operation. Thus, when it is referred to herein that a particular network layer is monitored, e.g., an agent 36b monitoring the data link layer, it is meant that one or more network entities, and/or data or signals generated by such entities, are monitored as relating to one or more aspects of the functionality of the layer in question. This is graphically represented by the dashed lines for the L1 and L2 layers in FIG. 3, which symbolize that the layers are not network entities per se, but rather that the functionality defined or described by the layers is embodied in and/or carried out by the network entities 38.

The network 32 further includes standard failover functionality for automatically switching to a redundant or standby network entity upon the failure or abnormal termination of the previously active entity, or some portion thereof. Thus, the network may have various active network entities 88, and one or more "protect" or standby network entities 90. The particular nature of the network's failover operations will depend on the particular components and communication protocols in question. Generally speaking, however, communications over the network are monitored on an ongoing basis for detecting signal fail conditions or signal degrade conditions. Once such a condition is detected, the hardware switches from the working entity 88 to a backup or protect entity 90 based on the nature and location of the failover condition. In the case of communications over a SONET OC-3 line, for example, failure in a multilink group (e.g., the failure of one or more components along a data path) may be indicated by K1/K2 byte failures in a synchronous transport module (STM), synchronous transport signal (STS), or other data frame. (K1 and K2 bytes are part of the SONET control channel, for signaling and measuring error rates.) Detection of K1/K2 byte failures triggers the move to an appropriate protected or standby device, and thereby to an alternate data link end point. L1 alarms may also be generated, by one or both of the original end points 92a, 92b or otherwise. The alternate end point receives the STM frame with K1/K2 byte indicators, and the STM frame is stabilized. Once the data frames are exchanged correctly across the new data link, the L1 alarms, if present, are cleared. Subsequently, L1 and L2 bundles are negotiated or setup.

Failover operations 34 typically result in the generation of one or more failover indicators 44 in the network. That is, the failover indicators 44 are evidence of the possible occurrence of a failover operation in the network. The specific type of failover indicators 44 generated upon commencement of a failover operation 34 will depend on the particular network entities involved. As noted above, however, the failover indicators can be characterized as including L1 (physical layer) failover indicators 48 and L2 (data link layer) failover indicators 50. The most common L1 failover indicators are physical layer alarms such as DS1/T1/E1 alarms, OC-3/SONET alarms, and DS3 alarms. Such alarms are generated by network end point entities, e.g., a network switch 78a, upon detection of a problem in the L1 layer, as described above. In the L2 layer, typical failover indicators 50 include data link protocol errors and information and signaling exchanges associated with failover operations in the data link layer. In optical networks with APS, for example, it is typically the case that the working entity (e.g., router 80a or switch 78a) exchanges signals with the standby or protect entity (e.g., router 80b or switch 78b) as part of the failover operation, according to a predetermined signaling protocol. Even though L1 alarms and other signaling indications are defined in individual standards, network entities can be configured to control their propagation. Such controls can be implemented at source network entities, or at entities in the transmission path.

The two hardware/software agents 36a, 36b are deployed in the network 32 to monitor the L1 (physical) layer 40 and the L2 (data link) layer 42, respectively. For this purpose, the agents 36a, 36b are interfaced with one or more network entities 38 of interest. For example, a copy or iteration of each agent 36a, 36b may be deployed on each network entity designated for monitoring under the system 30. The agents 36a, 36b may be implemented in computer hardware and/or software. For example, each agent could be a hardware module, script, and/or other computer program or suite of programs configured to run on or in conjunction with the operating platform of a network switch, router, or other entity. The agents 36a, 36b may be separate elements, or they may be functionally separate but housed together in a common unit or "agent module" 94. Alternatively, the functions of both agents 36a, 36b may be implemented as a single agent/unit. Regardless of the medium or manner in which they are implemented, the agents 36a, 36b monitor the network's L1 and L2 layers 40, 42, respectively, as these layers relate to the particular network entities with which the agents are interfaced, for the presence of indicators 44 associated with failover operations 34 in the network 32. Thus, one agent 36a (or multiple iterations thereof) monitors one or more network entities 38 for DS1 alarms 46 or other L1 failover indicators 48. The second agent 36b (or multiple iterations thereof) monitors one or more network entities for L2 failover indicators 50, including protocol errors and/or information and signaling exchanges 52 associated with failover operations. For example, the agent may monitor the control signals arriving at and issued by a monitored network entity for the presence of one or more predefined L2 failover indicators 50. Normally, DS1 alarms are localized to two sides of the L1 facilities. The first agent 36a monitors the alarms propagated to it for a particular transmission path. With help of the second agent 36b, which is also monitoring the same transmission path, the agents 36a, 36b can determine the congestion reason.

Concurrently with the L1 and L2 layers being monitored for the presence of indicators 44 associated with failover operations 34 in the network 32, it is determined if a failover operation 34 has occurred. For this purpose, the agents 36a, 36b may include, or otherwise operate in conjunction with, one or more processing filters 100a, 100b. In operation, the agents 36a, 36b generate data relating to the indicators. The filters 100a, 100b process this data for determining/predicting if a failover operation has occurred. An example of this process is illustrated in FIG. 4. Here, the agents 36a, 36b correlate or cross-reference the failover indicators 44 (generated by the monitored network entities) to a time scale 112 of data transfer over the network, that is, the failover indicators are associated with time data for showing "what occurred when" in the network in regards to possible failover operations. For this, each failover indicator 102a-102c may be associated with a data set 104a-104c. Included in each data set 104a-104c are: (i) time data 106 associated with the failover indicator, e.g., the time when the failover indicator occurred or was generated or detected; (ii) entity data 108 relating to the entity or entities with which the failover indicator is associated; and (iii) possibly other data 110. For example, in the case of a DS1 alarm, the data set might include: (i) the time the alarm was generated; (ii) which network entity generated the alarm; and (iii) other data relating to the alarm. The various data sets 104a-104c, with the time data 106 associated therewith, in effect form a timeline relating to possible failover operations. The filters 100a, 100b process the data 104a-104c for determining if a failover operation has occurred. If so, failover data 114 is generated by the filters 100a, 100b. The failover data 114 indicates that a failover operation has occurred, and may include information relating to the failover operation, such as when the failover operation commenced.

For predicting the occurrence of failover operations, the filters 100a, 100b may be configured to operate in a number of different manners, depending on the particular components and protocols in place on the network 32. Generally speaking, the filters 100a, 100b compare the failover indicators 102a-102c to one another, and to one or more empirically determined conditions, criteria, or thresholds associated with failover operations in the network. In other words, it is determined if the failover indicators, relative to one another in terms of the time scale 112, etc., meet certain criteria suggesting the likely occurrence of a failover operation. For example, if it happened to be the case that the generation of two DS1 alarms by two different entities within a set time period corresponded to a failover operation 90% of the time in the network 32, then the filters 100a, 100b would determine if any of the failover indicators 102a-102c met these conditions, e.g., whether there were two DS1 alarms generated by two different entities within the set time period. If so, the filters would generate failover data 112 indicating a "true" value for the occurrence of a failover operation. (This assumes that a 90% level of accuracy is sufficient for a "true" condition.) Accuracy is increased by monitoring the recovery activities of the network, through review of one or more network indicator data sets, e.g., data sets of network conditions such as frame error rate and traffic load during a time period of interest. The filters and agent(s) may evaluate the data sets to determine if the network characteristics match expected behaviors, for example, in time frame T1 to T4 from FIG. 1. Based on data sets gathered for intervals T1 to T2, T3 to T4, and T2 to T3, the agent module 94 can separate out congestion due to actual overloading of facilities versus congestion due to failover.

The L1 and L2 layers are monitored to provide a maximum number of data points, for more accurate determinations of whether failover operations have occurred. For example, certain L1 indicators may be filtered out by certain network entities, making sole reliance on such indicators less reliable. By monitoring both the L1 and L2 layers, even if the L1 indicators are discarded or unusable, a failover operation may still be accurately predicated based on the L2 indicators.

As should be appreciated, although only two agents 36a, 36b are shown as generating the indicator data 104a-104c in FIG. 4, it is typically the case that a number of L1 layer agents and L2 layer agents generate such data. For example, a plurality of network entities will typically each be provided with the agents 36a, 36b, with all the agents reporting the data to the filters 100a, 100b or other processing unit. By monitoring the failover indicators 44 over all involved entities and relating them on the time scale or time line 112, it is possible to predict whether failover has started.

With reference to FIG. 3, as part of ongoing network operations, one or more of the network entities 116 carry out traffic control procedures for controlling data traffic on the network. Data traffic is controlled according to a congestion monitoring and recovery algorithm/process 118. For actual data congestion, that is, for data congestion associated with data traffic volume in the network and/or not specifically associated with a failover operation, data packets associated with the actual data congestion are controlled in a standard manner according to the network's standard congestion control mode 56. For example, data sources may be controlled to reduce the traffic load, including possible call drops, if required for maintaining a designated minimum quality level for high priority communications. In regards to data congestion resulting from failover operations, the filters 100a, 100b provide the traffic control entity 116 with information 114 indicating that a failover has occurred and/or that associates certain traffic congestion with a failover operation. Using this information, data packets associated with the failover congestion are controlled using the failover congestion control mode 54, which accounts for the temporary nature of the failover data congestion. For example, data packets associated with the failover congestion may be controlled according to the data source backoff model 58, which controls delays in transmission and/or re-transmission of the data packets at the transmission source(s). In other words, instead of dropped calls, data packets are delayed in a controlled manner. This delay is sufficient to accommodate the failover operation, wherein once the failover operation is complete, the data packets are then transmitted or re-transmitted over the newly established link.

Further regarding use of the failover data 114, the traffic control plane (including traffic schedulers, admission controls, call and flow managers, etc.) can interpret the data to define one or more corrective actions. In wireless networks, soft handoff traffic for voice calls is important to the life of the call in dynamic RF conditions. If the primary leg of a voice call is in a weak area, dropping its secondary handoff leg during failover can result in a dropped call. In such cases, if an agent indicates that a failover operation has occurred, this can help in maintaining the call. Also, underlying traffic schedulers can use failover determinations to adopt temporary throttling rules for low priority traffic. Traffic patterns can be separated at the network and data link layers by adopting an alternate de-queuing algorithm while the failover congestion lasts.

In the system 30, network traffic is maintained to the maximum extent possible, which nevertheless contemplates reducing the traffic load if situations warrant. With reference to FIG. 1, it may be the case that at time T4 the failed-over bandwidth is still less than the traffic load. For example, errors in failover devices can cause a multilink group of 4 DS1 to shrink to 2 DS1 because the remaining two DS1's are not setup on the new routers. In such cases, if the traffic is greater than 2 DS1, the system will need to shed a portion of the traffic load.

As should be appreciated, the system 30 is particularly applicable to congestion situations involving stateless failovers. In stateless failovers, as noted above, although the standby component(s) assumes the communication addresses of the failed component, any open connections are closed, which requires renegotiation and reconnection with the standby component. The system 30 may also be implemented for use in network configurations where stateful failovers may occur. For example, referring back to the network 32 in FIG. 2, it is possible that the routers 80a, 80b could be configured to support a hot standby mode. In such a mode, the state of the active router (working path) is communicated to the standby router (failover path) over a dedicated link. In case of failover, in this mode, the system 30 may or may not be applicable, depending on the various components in use and their configurations.

Since certain changes may be made in the above-described method of maintaining traffic services through congestion caused by network failovers, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A method of data traffic control in a communication network, said method comprising:
monitoring, using at least one network entity of the network, data traffic to determine if a failover operation has occurred in the network; and, if so,
controlling, using the at least one network entity of the network, the data traffic in the network based on a differentiation between data congestion associated with data traffic volume in the network and data congestion associated with the failover operation; wherein:
the data congestion associated with the data traffic volume in the network and the data congestion associated with the failover operation are controlled using first and second traffic control modes, respectively;
the first mode is a general purpose congestion monitoring and recovery mode for controlling data congestion in the network without regard to any particular source of the data congestion; and
the second mode is a failover congestion monitoring and recovery mode formulated to prevent instances of dropped communications on the network associated with the failover operation including instances that would be permitted by the first mode.

2. The method of claim 1 further comprising:
monitoring a physical layer of the network and a data link layer of the network for indications associated with failover operations in the network using the at least one network entity of the network, said physical and data link layers being associated with the at least one network entity for the transmission of data across the network.

3. The method of claim 2 further comprising:
correlating said failover indications to a designated time scale of data transfer over the network using the at least one network entity of the network; and
determining if a failover operation has occurred based on the failover indications correlated to the designated time scale using the at least one network entity of the network.

4. The method of claim 3 wherein:
a plurality of network entities are monitored for failover indications; and
the failover indications for said plurality of network entities are correlated to the time scale.

5. The method of claim 4 wherein:
the physical layer is monitored for occurrences of physical layer alarms generated by any of the plurality of network entities; and
the data link layer is monitored for occurrences of data link protocol errors and/or information exchanges associated with failover operations in the data link layer, said data link layer being associated with said plurality of network entities.

6. The method of claim 2 wherein:
the physical layer is monitored for occurrences of physical layer alarms generated by the at least one network entity; and
the data link layer is monitored for occurrences of data link protocol errors and/or information exchanges associated with failover operations in the data link layer.

7. The method of claim 1 wherein the second mode uses a data source backoff model for controlling delays in transmission and/or re-transmission of data packets associated with the data congestion associated with the failover operation.

8. The method of claim 7 further comprising:
monitoring a physical layer of the network and a data link layer of the network for indications associated with failover operations in the network using the at least one network entity of the network, said physical and data link layers being associated with the at least one network entity for the transmission of data across the network.

9. The method of claim 8 further comprising:
correlating said failover indications to a time scale of data transfer over the network using the at least one network entity of the network; and
determining if a failover operation has occurred based on the failover indications correlated to the time scale using the at least one network entity of the network.

10. The method of claim 9 wherein:
a plurality of network entities are monitored for failover indications; and
the failover indications for said plurality of network entities are correlated to the time scale.

11. The method of claim 10 wherein:
the physical layer is monitored for occurrences of physical layer alarms generated by the plurality of network entities; and
the data link layer is monitored for occurrences of data link protocol errors and/or information exchanges associated with failover operations in the data link layer, said data link layer being associated with said plurality of network entities.

12. The method of claim 8 wherein:
the physical layer is monitored for occurrences of physical layer alarms generated by the at least one network entity; and
the data link layer is monitored for occurrences of data link protocol errors and/or information exchanges associated with failover operations in the data link layer.

13. A method of data traffic control in a communication network including a plurality of network entities, said method comprising:
monitoring data traffic of the communication network for indications associated with failover operations in the network using at least one of the network entities;
determining that a failover operation has occurred in the network based on said indications using the at least one of the network entities; and
controlling data congestion associated with the failover operation according to a failover congestion monitoring and recovery mode using the at least one of the network entities;
wherein the failover congestion monitoring and recovery mode is configured for preventing instances of dropped communications on the network associated with failover operations including instances that would be permitted by a general purpose traffic control mode of the network where the association of the failover congestion with the failover operation is not considered;
wherein the failover congestion monitoring and recovery mode utilizes a data source backoff model for controlling delays in transmission and/or re-transmission of data packets associated with said communications.

14. The method of claim 13 further comprising:
monitoring a physical layer of the network and a data link layer of the network for said indications associated with failover operations in the network using the at least one of the network entities, said physical and data link layers being associated with said network entities for the transmission of data across the network.

15. The method of claim 14 further comprising:
correlating said failover indications to a time scale of data transfer over the network using the at least one of the network entities; and
determining, using the at least one of the network entities, that the failover operation has occurred based on the failover indications correlated to the time scale.

16. The method of claim 15 wherein:
the physical layer is monitored for occurrences of physical layer alarms generated by any of the at least one of the network entities; and
the data link layer is monitored for occurrences of data link protocol errors and/or information exchanges associated with failover operations in the data link layer, said data link layer being associated with said at least one network entity.

17. A method of data traffic control in a communication network including a plurality of network elements, said method comprising:
monitoring a physical layer of the network and a data link layer of the network for indicators associated with failover operations in the network using a network entity of the network, said physical and data link layers being associated with at least the network entity;
determining whether a failover operation has occurred based on the indicators associated with failover operations using the network entity of the network; and, if so,
controlling data traffic associated with the failover operation using a data source backoff model using the network entity of the network;
wherein the failover congestion monitoring and recovery mode is configured for preventing instances of dropped communications on the network associated with failover operations including instances that would be permitted by a general purpose traffic control mode of the network where the association of the failover congestion with the failover operation is not considered;
wherein the failover congestion monitoring and recovery mode utilizes a data source backoff model for controlling delays in transmission and/or re-transmission of data packets associated with said communications.

18. The method of claim 17 wherein the data associated with the indicators includes (i) time data of when the indicators occurred and (ii) data relating to at least the network entity with which the indicators are respectively associated.

* * * * *